United States Patent [19]

Sugitani et al.

[11] 4,437,100

[45] Mar. 13, 1984

[54] INK-JET HEAD AND METHOD FOR PRODUCTION THEREOF

[75] Inventors: Hiroshi Sugitani, Machida; Hiroto Matsuda, Yokohama; Masami Ikeda, Chiba, all of Japan

[73] Assignee: Canon Kabushiki Kaisha, Tokyo, Japan

[21] Appl. No.: 385,092

[22] Filed: Jun. 4, 1982

[30] Foreign Application Priority Data

| | | | |
|---|---|---|---|
| Jun. 18, 1981 | [JP] | Japan | 56-94884 |
| Jun. 24, 1981 | [JP] | Japan | 56-97923 |
| Jun. 24, 1981 | [JP] | Japan | 56-97924 |
| Jun. 24, 1981 | [JP] | Japan | 56-97925 |

[51] Int. Cl.$^3$ .............................................. G01D 15/18

[52] U.S. Cl. ................................. 346/1.1; 346/140 R

[58] Field of Search .......................... 346/140 PD, 1.1

[56] References Cited

U.S. PATENT DOCUMENTS

| | | | |
|---|---|---|---|
| 4,335,389 | 6/1982 | Shirato et al. | 346/140 PD |
| 4,368,476 | 1/1983 | Uehara et al. | 346/140 PD |

FOREIGN PATENT DOCUMENTS

| | | | |
|---|---|---|---|
| 55-87573 | 7/1980 | Japan | 346/140 PD |
| 55-109670 | 8/1980 | Japan | 346/140 PD |

*Primary Examiner*—E. A. Goldberg
*Assistant Examiner*—Todd E. DeBoer
*Attorney, Agent, or Firm*—Fitzpatrick, Cella, Harper & Scinto

[57] ABSTRACT

An ink-jet head comprising an ink flow path of a hardened film of a photosensitive resin composition provided on the surface of a substrate, characterized in that a binding auxiliary layer is interposed between said substrate surface and the hardened film.

16 Claims, 8 Drawing Figures

INK-JET HEAD AND METHOD FOR PRODUCTION THEREOF

BACKGROUND OF THE INVENTION

1. Field of the Invention

This invention relates to an ink-jet head, more particularly to an ink-jet head for generation of small ink droplets for recording used for the so called ink-jet recording system, and to a method for production thereof.

2. Description of the Prior Art

An ink-jet head to be applied for the ink-jet recording system is generally provided with minute ink discharging outlets (orifices) having apertures of about some 10μ to 100μ, ink flow paths and portions for generating ink discharging pressure provided at a part of said ink flow paths.

In the prior art, as the method for preparing such an ink-jet head, there has been known, for example, a method in which minute grooves are formed by way of cutting or etching on a plate of a glass or a metal, and then the plate having such grooves is bonded to another appropriate plate for formation of ink flow paths. There were formerly made proposals relating to ink-jet heads constituted by utilization of photosensitive resin compositions, as disclosed in U.S. patent application Ser. No. 238,422, German Laid-open Patent Application No. 31 08 206, and British Laid-open patent application No. 20 72 099.

The ink-jet head proposed above has the various features set forth below:

(1) Since the main process steps in the fabrication of the ink-jet head rely on a so called photographic technique, highly precise and delicate portions in the head can be formed very simply by the use of desired patterns. In addition, a multitude of heads having the identical constructions may be worked simultaneously.

(2) The relatively few manufacturing steps result in a high productivity.

(3) Since registration among the principal structural portions constituting the head can be done easily and accurately, the ink-jet head having high dimensional precision can be obtained readily.

(4) Multi-array ink-jet heads of high density can be manufactured by a simple method.

(5) Since the depth of the groove constituting the ink flow path can be adjusted with extreme easiness, the ink path having a desired dimension can be formed depending on the layer thickness of the photosensitive (resin) composition.

(6) The ink-jet heads can be manufactured continuously and in an industrialized mass-production.

(7) Since there is no necessity for using etchant (strong acids such as hydrofluric acid and the like), the process is safe and hygienic.

On the other hand, a part of the ink-jet head may frequently be broken in the course of driving thereof, thus involving the drawback of being insufficient in so called usage life (or durability) in its practical application.

SUMMARY OF THE INVENTION

The object of the present invention is to provide an ink-jet head having markedly improved durability, while maintaining the various features as mentioned above.

Further, it is another object of the present invention to provide a method for producing an ink-jet head, which is minutely worked with good precision and has good durability, as well as high reliability, and good production yield.

According to an object of the present invention, there is provided an ink-jet head comprising an ink flow path of a hardened film of a photosensitive resin composition provided on the surface of a substrate, characterized in that a binding auxiliary layer is interposed between said substrate surface and the hardened film.

According to another object of the present invention, there is provided a method for producing an ink-jet head which comprises forming walls of an ink flow path of a hardened film of a photosensitive resin on at least one surface of a substrate with a binding auxiliary layer interposed therebetween simultaneously with or followed by removal of said auxiliary layer existing within the ink flow path, and then providing a covering member on said flow path.

BRIEF DESCRIPTION OF THE DRAWINGS

FIG. 1 through FIG. 8 all show drawings for illustration of the production steps of the present invention, in which:

FIG. 1 through FIG. 5, FIG. 7 and FIG. 8 are schematic cross-sectional views; and FIG. 6 is a perspective view of the appearance of the ink-jet head.

DETAILED DESCRIPTION OF PREFERRED EMBODIMENTS

Figure 1:
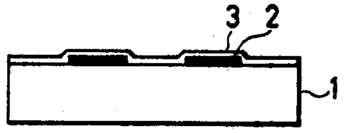

Referring now to the drawings, the present invention is to be described in detail.

First, one embodiment of the present invention is described in accordance with the drawing for illustration of the preparation steps as shown in FIG. 1 through FIG. 8.

In the step of FIG. 1, a desired number of ink discharging pressure generating elements 2 such as heat-generating elements or piezo elements are arranged on a substrate 1 such as of glasses, ceramics, plastics, or metals, and further, if desired, a thin film 3 such as of $SiO_2$, $Ta_2O_5$, or a glass is coated on the elements for imparting ink resistance, electric insulating property, etc. The ink discharging pressure generating elements 2 are connected to electrodes for signal input, although not shown in the drawing.

Figure 2:
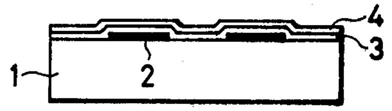

In the step shown in FIG. 2, a binding auxiliary layer 4 is formed to a thickness of about 0.1μ to 5μ on the surface of the substrate 1 having the above ink discharging pressure generating elements 2. As the binding auxiliary layer 4, there may be employed a resin type adhesive or thin film of a metal. When the binding auxiliary layer 4 is formed with a resin type adhesive, a desired liquid adhesive may be applied by coating according to well known methods such as spinner coating, dip coating, roller coating, etc., on the surface of a substrate to a thickness of about 1μ to 5μ, and then left to be semi-hardened.

More specifically, in case of the spinner coating method, an adhesive with a viscosity of 2 to 15 cp is coated at 1000 to 5000 rpm. On the other hand, in the case of the dip coating method, the substrate 1 is dipped in an adhesive with a viscosity of 20 to 30 cp and then withdrawn therefrom at a constant speed of 20 to 50 cm/min. Further, in case of the roller coating, an adhesive with a viscosity of 100 to 300 cp is coated at a roller circumference velocity of 60 to 200 cm/min.

The adhesive to be used in the present invention is not particularly limited in kinds, so long as a desirable adhesive strength can be exhibited. But, above all, a thermosetting resin adhesive and a photocurable resin adhesive are highly recommendable for their convenience in handling and in preparation.

Thus, preferable thermosetting resin adhesives to be used in the present invention may include resins obtained by condensation of an aldehyde such as formaldehyde with a compound such as phenol, resorcinol, urea, ethylene urea, melamine, benzoguanamine, xylene, etc.; furan resins; epoxy resins; unsaturated polyesters; polyurethanes; silicon resins; polydiallyl phthalates; or co-condensates thereof. And, photocurable resin adhesives may be exemplified by a combination of unsaturated polyester with a monomer, dimer or oligomer compound having at least one unsaturated double bond in the molecule (e.g. methyl methacrylate, styrene, diallyl phthalate, etc.); a combination of unsaturated polyester with a resin such as silicon, urethane, epoxy and other resins modified so as to have at least one unsaturated double bond in the terminal groups or in the main chain; or a combination of unsaturated polyester with the aforesaid modified resin and with the aforesaid monomer, dimer or oligomer.

In the present invention, when the interface boundary to which theses adhesives are to be adhered is formed of a compound based on Si, it is also effective to mix a silane coupling agent with the aforesaid adhesives or treat previously the surface of the substrate 1 with a silane coupling agent.

As such a silane coupling agent, there may effectively be used those as enumerated below.

| Type of functional group | Chemical nomenclature | Structural formula |
|---|---|---|
| Chloro | γ-Chloropropyl trimethoxysilane | $Cl(CH_2)_2Si(OCH_3)_3$ |
| Vinyl | Vinyl trichlorosilane | $CH_2{=}CHSiCl_3$ |
| | Vinyl trimethoxysilane | $CH_2{=}CHSi(OCH_3)_3$ |
| | Vinyl triethoxysilane | $CH_2{=}CHSi(OC_2H_5)_3$ |
| | Vinyl triacetoxysilane | $CH_2{=}CHSi(OOCCH_3)_3$ |
| | Vinyl tris-(β-methoxyethoxy)-silane | $CH_2{=}CHSi(OCH_2CH_2OCH_3)_3$ |
| | N—β-(N—vinylbenzylaminoethyl)-γ-aminopropyltrimethoxysilane | 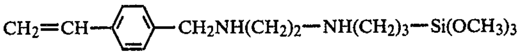 |
| Methacryl | γ-Methacryloxypropyltrimethoxysilane | $CH_2{=}C(CH_3){-}CO(CH_2)_3Si(OCH_3)_3$ (with C=O) |
| Epoxy | β-(3,4-epoxycyclohexyl)-ethyltrimethoxysilane | 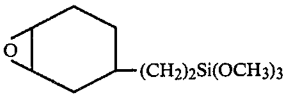 |
| | γ-Glycidoxypropyltrimethoxysilane | $\overset{O}{CH_2{-}CH}CH_2O(CH_2)_3Si(OCH_3)_3$ |
| Mercapto | γ-Mercaptopropyltrimethoxysilane | $HS(CH_2)_3Si(OCH_3)_3$ |
| Amine | γ-Aminopropyltriethoxysilane | $NH_2(CH_2)_3Si(OC_2H_5)_3$ |
| | N—β-(aminoethyl)-γ-aminopropyltrimethoxysilane | $NH_2(CH_2)_2NH(CH_2)_3{-}Si(OCH_3)_3$ |
| | N—β-(aminoethyl)-γ-aminopropyldimethoxysilane | $NH_2(CH_2)_2NH(CH_2)_3{-}Si(OCH_3)_2CH_3$ |
| | N—(dimethoxymethylsilylisobutyl)ethylenediamine | $NH_2(CH_2)_2NHCH_2CH{-}(CH_3)CH_2Si(OCH_3)_2{-}CH_3$ |
| | γ-[Bis(β-hydroxyethyl)]-aminopropyltriethoxysilane | $(HOCH_2CH_2)_2N(CH_2)_3{-}Si(OC_2H_5)_3$ |
| | γ-Ureidopropyltriethoxysilane | $NH_2CONH(CH_2)_3Si(OC_2H_5)_3$ |
| | N—[N'—(β''-methoxycarbonylethyl)-β'-aminoethyl]-γ-aminopropyltrimethoxysilane | $CH_3OOCCH_2CH_2NH(CH_2)_2{-}NH(CH_2)_3{-}Si(OCH_3)_3$ |
| Others | Methyltrimethoxysilane | $CH_3Si(OCH_3)_3$ |
| | Phenyltrimethoxysilane | $C_6H_5Si(OCH_3)_3$ |

When the binding auxiliary layer 4 is to be formed with a thin metal film, there may be employed well known vapor deposition method, sputtering method, chemical plating method for formation of a thin film such as of Cu, Ni, Cr, Ti, Ta, etc. The thin metal film 4 in this case may have a thickness suitably of 0.1μ to 5μ.

Figure 3:
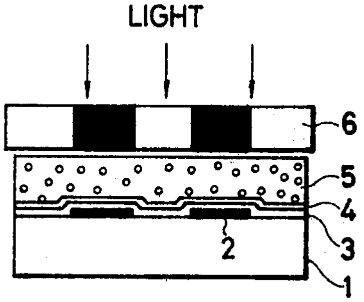

In the subsequent step as shown in FIG. 3, the surface of the binding auxiliary layer 4 obtained on the substrate 1 after the step as shown in FIG. 2 is cleaned and dried. Then, a dry film photoresist 5 (film thickness: about 25μ to 100μ) heated to about 80° C. to 105° C. is superposed on the binding auxiliary layer 4 and laminated at a rate of 0.5 to 4 feet/min. under the pressurization condition of 1 to 3 kg/cm2. The dry film photoresist exhibits self-adhesiveness so as to be fused to the binding auxiliary layer 4. Subsequently, depending on the property of the adhesive employed, the adhesive layer is subjected to heating or irradiation by UV-rays to effect full hardening thereof. The dry film photoresist 5 will never thereafter be peeled off from the substrate 1 even when a considerable external pressure may be applied thereon. As the next step, as shown in FIG. 3, a photomask 6 having a desirable pattern is superposed on the dry film photoresist 5 provided on the substrate surface, and then light exposure is effected over the photomask 6. It is thereby necessary to fit the position at which the ink discharging pressure generating element is set to that of the aforesaid pattern according to the well known method.

Figure 4:
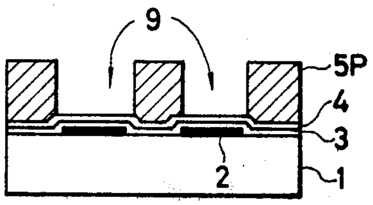

FIG. 4 shows a drawing for illustration of the step for dissolving away the unexposed portion of the above exposed dry film photoresist 5 with a developer comprising a certain organic solvent.

Next, for improvement of ink resistance of the exposed portion **5*p* of the dry film photoresist remaining on the substrate 1**, thermal curing treatment (for example, by heating at 150° to 250° C. for 30 minutes to 6 hours) or UV-ray irradiation (for example, at a UV-ray intensity of 50 to 200 mw/cm$^2$ or more) is applied to promote sufficiently the progress of the polymerizing curing reaction. It is also effective to employ both of the above thermal curing and the curing by UV-ray irradiation.

Figure 5:
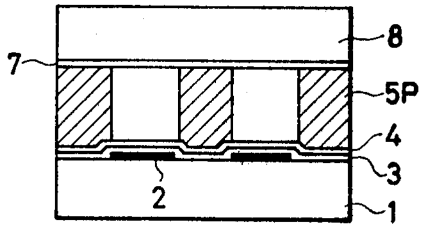

FIG. 5 is a drawing, showing a flat plate 8 constituting the ceiling fixed by adhesion or by mere pressure bonding onto the substrate 1 having formed grooves 9 for ink flow paths made of the dry film photoresist **5*p*** hardened after completion of sufficient polymerization.

In the step as shown in FIG. 5, typical examples of the method for construction of the ceiling may include the following:

(1) A flat plate 8 of a glass, a ceramic, a metal or a plastic is subjected to spinner coating with an epoxy type adhesive to a thickness of 3 to 4μ, then to the so-called B-staging of the adhesive 7 by preheating the coated product and the resultant product is laminated on the photoresist film **5*p*, followed by full hardening of said adhesive; or (2) A flat plate 8 of a thermoplastic resin such as acrylic resin, ABS resin, polyethylene, etc., is thermally fused directly onto the hardened photoresist film 5*p***.

By the way, in some cases, a part of the binding auxiliary layer 4 may remain in grooves 9, thereby causing troubles such as dissolving out into the ink or damaging the function of the ink discharging pressure generating element 2. In such cases, for the purpose of minimizing the deleterious influences, it is desirable to remove the binding auxiliary layer 4 remaining in the grooves 9 prior to the step as shown in FIG. 5 according to, for example, the method (1), (2) or (3) shown below:

(1) After the above binding auxiliary layer 4 is formed of a thermosetting type resin adhesive or a photocurable type resin adhesive has been hardened, and when there is not suitable solvent for dissolving the hardened layer, the adhesive layer in the grooves 9 may be removed by incineration by use of an oxygen plasma;

(2) When the above binding auxiliary layer 4 is a photocurable type resin adhesive, the adhesive is photocured simultaneously with pattern exposure on the dry film photoresist 5 and the unhardened region is dissolved away together with the photoresist 5 at the stage of developing with an organic solvent; or (3) When the above binding auxiliary layer 4 is constituted of a metal thin film, it is removed by a desirable etching method.

In order to omit such a removal step, a metal less reactive with the ink, for example, a noble metal such as gold or platinum may be used to coat the thin metal film within the grooves 9, or alternatively an inorganic oxide film such as $SiO_2$, $Ta_2O_5$, $Si_3N_4$, etc., may be formed as a corrosion resistant film on the metal thin film within the grooves 9 to a thickness of 2 to 5μ by such a method as vapor deposition, sputtering, CVD or others.

In the following Table, there are shown the results of peel-off strength (Test A) of the photoresist hardened film **5*p* from the substrate 1 and residual percentage (Test B) of the photoresist hardened film 5*p* (1 mm×1 mm) when immersed in water at 50° C. for one week, for each of the various samples prepared according to the steps as described above, namely in the case of the binding auxiliary layer 4 of an acrylic resin type photocurable adhesive coated to a thickness of 1μ (. . . Example 1), of an epoxy resin type thermosetting adhesive coated to a thickness of 1μ (. . . Example 2), of a Cu film with 1μ thickness (. . . Example 3), of a Ta film with 1μ thickness (. . . Example 4), of a Ni film with 0.5μ thickness (. . . Example 5), of a Cr film with 2μ thickness ( . . . Example 6), of a Ti film with 1.5μ thickness ( . . . Example 7), and, for comparative purpose, in case of the dry film photoresist hardened film 5*p* provided directly on the $SiO_2$ thin film 3** with a 1μ thickness (. . . Comparative example).

| | Test A (kg/cm$^2$) | Test B (%) |
|---|---|---|
| Example 1 | 88 | 70–85 |
| Example 2 | 55 | 65–80 |
| Example 3 | 55 | 60–70 |
| Example 4 | 35 | 55–60 |
| Example 5 | 35 | 58–65 |
| Example 6 | 40 | 60–65 |
| Example 7 | 45 | 60–70 |
| Comparative example | 10 | 0 |

Figure 6:
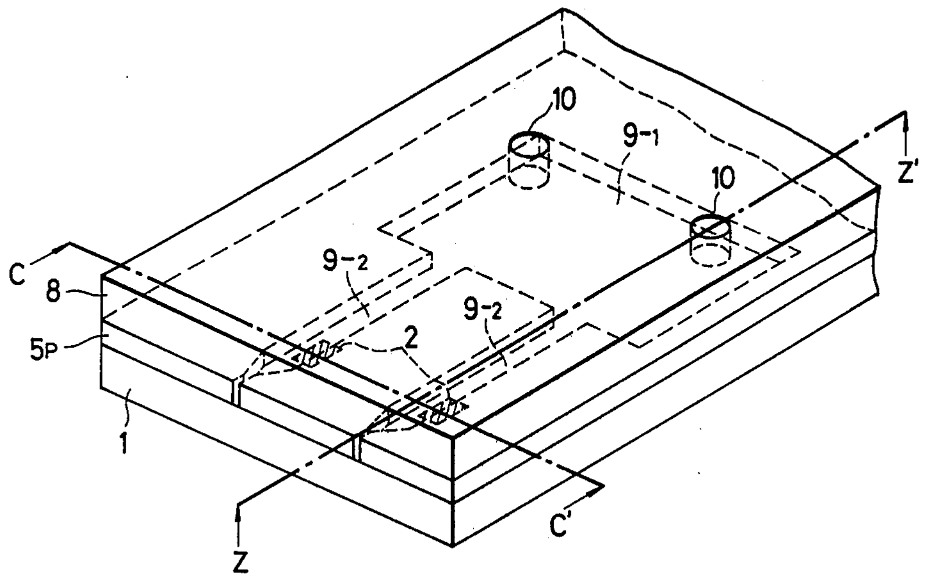

The head appearance after completion of the step as shown in FIG. 5 is shown in FIG. 6 by way of a schematic perspective view.

In FIG. 6, 9-1 an ink supplying chamber, 9-2 thin ink flow paths, 10 a thru-hole for connection to an ink supplying tube which is not shown in the drawing.

As described above, after completion of bonding between the substrate having the grooves and the flat plate, the bonded product is cut along the line C—C' in FIG. 6. This is done for optimization of the distance between the ink discharging pressure generating element 2 and the ink discharging port 9-3 in the thin ink flow paths 9-2, and the region to be cut may optimally be determined. In practicing this cutting operation, there may be employed the dicing method which is generally employed in semiconductor industries.

Figure 7:
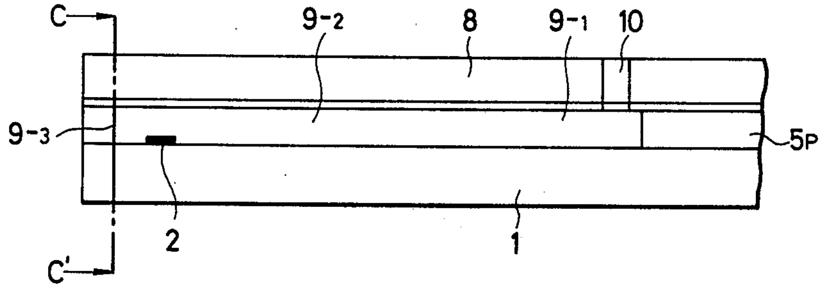
Figure 8:
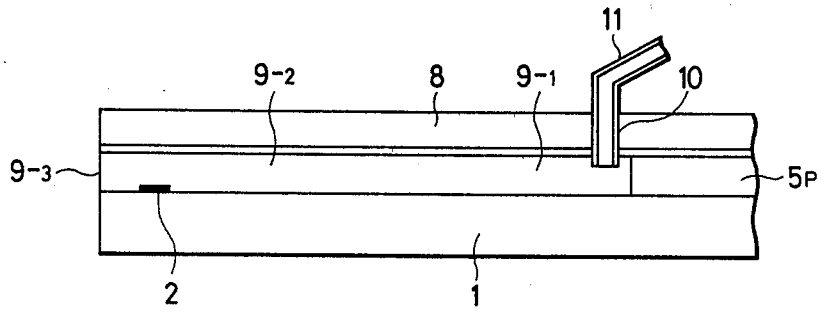

FIG. 7 is a sectional view taken along the line Z—Z' in FIG. 6, and the cut surface is made smooth by polishing and thereafter equipped with an ink supplying tube 11 at the thru-hole 10 to complete the ink jet head (FIG. 8).

In the above-described embodiment, a dry film photoresist is used as the photosensitive composition for forming grooves. It should, however, be noted that the present invention is not limited to such solid material alone, but a liquid photosensitive composition may be also utilized. A coating film of the photosensitive composition in a liquid form may be formed on the substrate by a squeezing method which is used for producing a relief picture image, i.e., a method wherein a wall of the same height as a desired film thickness of the photosensitive composition is provided around the substrate, and excessive composition is removed by squeezing. In this case, viscosity of the liquid photosensitive composition perferably ranges from 100 to 300 cps. It is further necessary that the height of the wall surrounding the substrate be determined in by the decrease in the quantity of the solvent due to vaporization thereof. In the case of a solid photosensitive composition, the film of the photosensitive composition may be adhered to the substrate under heat and pressure as explained in the foregoing. In the present invention, use of a solid photosensitive composition in film form is advantageous since the handling is convenient and easy and precise control of the film thickness is possible. Examples of such solid photosensitive composition are those photosensitive resin films manufactured and sold by Dupont de Nemour & Co. under tradenames of Permanent Photopolymer Coating "RISTON," photosensitive acrylic resin compositions such as Solder Mask 730S, Solder Mask 740S, Solder Mask 730FR, Solder Mask 740FR, Solder Mask SM1, and the like, all of which are commercially available. Besides these, there may be enumerated various kinds of photosensitive compositions used in the field of ordinary photo-lithography such as photosensitive resins, photo-resists, etc. Actual examples are: diazo-resin; p-diazo-quinone; photo-polymerization type photo-polymers using, for example, a vinyl monomer and a polymerization initiator; dimerization type photopolymers using polyvinyl cinnamate, etc., and a sensitizing agent; a mixture of o-naphthoquinone diazide and a Novolac type phenolic resin; a mixture of polyvinyl alcohol and a diazo resin; polyether type photo-polymers obtained by copolymerization of 4-glycidylethylene oxide with benzophenone, glycidylchalcone, or the like; copolymer of N,N-dimethylmethacryl amide and, for example, acrylamide benzophenone; unsaturated polyester type photosensitive resins such as APR (product of Asahi Kasei Kogyo K.K., Japan), TEBISUTA (product of Teijin K.K., Japan), Sonne (product of Kansai Paint K.K., Japan), and the like; unsaturated urethane oligomer type photosensitive resins; photosensitive compositions composed of a photo-polymerization initiator, a polymer, and a bifunctional acryl monomer; dichromate type photo-resists; non-chromium type water-soluble photo-resists; polyvinyl cinnamate type photo-resists; cyclized rubber-azide type photo-resists, and so forth.

When the resolution of the photosensitive compositions used in the present invention is so low that the desired thin ink flow path (in particular, nozzles) and the desired diameter of the ink discharging ports cannot be obtained, such portions alone may be subjected to cutting by means of a cutting machine such as a cutter for cutting silicon wafers and the like.

As described above in detail, in accordance with the present invention, there can be provided an ink-jet head markedly improved in durability as compared with those of prior art. In addition, there can also be obtained the various effects as shown below at the same time:

(1) Since the main process steps in the fabrication of the ink-jet head rely on a so called photographic technique, highly precise and delicate portions in the head can be formed very simply by use of desired patterns. In addition, a multitude of heads having the identical constructions may be worked simultaneously.

(2) The relatively less manufacturing steps result in a high productivity.

(3) Since registration among the principal structural portions constituting the head can be done easily and accurately, the ink-jet head having high dimensional precision can be obtained readily.

(4) Multi-array ink-jet heads of high density can be manufactured by a simple method.

What we claim is:

1. An ink-jet head comprising an ink flow path constituted of a hardened film of a photosensitive resin composition provided on the surface of a substrate, characterized in that a binding auxiliary layer is interposed between the substrate surface and the hardened film.

2. An ink-jet head according to claim 1, wherein the binding auxiliary layer is constituted of a thermosetting type resin adhesive.

3. An ink-jet head according to claim 1, wherein the binding auxiliary layer is constituted of a photocurable type resin adhesive.

4. An ink-jet head according to claim 1, wherein the binding auxiliary layer is constituted of a thin metal film.

5. An ink-jet head according to claim 1, wherein the binding auxiliary layer is constituted of a resin type adhesive containing a silane coupling agent.

6. An ink-jet head according to claim 1, wherein the binding auxiliary layer is constituted of a coated film of a silane coupling agent.

7. An ink-jet head according to claim 1, wherein the binding auxiliary layer is provided in a thickness within the range of from $0.1\mu$ to $5\mu$.

8. An ink-jet head according to claim 1, wherein the ink discharging pressure generating element is provided on the substrate surface.

9. A method for producing an ink-jet head comprising the steps of: forming walls of an ink flow path constituted of a hardened film of a photosensitive resin on at least one surface of a substrate with a binding auxiliary layer interposed therebetween; removing simultaneously with the formation or following the formation of the walls, portions of the auxiliary layer existing within the ink flow path; and then providing a covering member on the ink flow path.

10. A method according to claim 9, wherein an ink discharging pressure generating element is previously provided on said substrate.

11. A method according to claim 9, wherein the binding auxiliary layer is constituted of a thermosetting type resin adhesive.

12. A method according to claim 9, wherein the binding auxiliary layer is constituted of a photocurable type resin adhesive.

13. A method according to claim 9, wherein the binding auxiliary layer is constituted of a thin metal film.

14. A method according to claim 9, wherein the binding auxiliary layer is constituted of a resin type adhesive containing a silane coupling agent.

15. A method according to claim 9, wherein the binding auxiliary layer is constituted of a coated film of a silane coupling agent.

16. A method according to claim 9, wherein the binding auxiliary layer is provided in a thickness within the range of from $0.1\mu$ to $5\mu$.

* * * * *

UNITED STATES PATENT AND TRADEMARK OFFICE
CERTIFICATE OF CORRECTION

PATENT NO. : 4,437,100

DATED : March 13, 1984

INVENTOR(S) : HIROSHI SUGITANI ET AL.

It is certified that error appears in the above-identified patent and that said Letters Patent is hereby corrected as shown below:

Column 2, line 2, delete "," (second occurrence).

Column 7, line 11, change "perferably" to --preferably--.

Column 8, line 37, change "the" to --an--.

Column 8, line 44, after "removing" insert --,--.

Signed and Sealed this

*Twenty-sixth* Day of *June 1984*

[SEAL]

*Attest:*

GERALD J. MOSSINGHOFF

*Attesting Officer* *Commissioner of Patents and Trademarks*